METHOD OF PREPARING SOLID ELASTOMERS FROM UNCURED LIQUID ORGANIC POLY-THIOPOLYMERCAPTAN POLYMERS

Eugene J. Molnar, La Grange, Ill., assignor to Coe Laboratories, Inc., Chicago, Ill.
No Drawing. Filed June 10, 1959, Ser. No. 819,250
16 Claims. (Cl. 260—31.8)

This invention relates to improved elastomeric compositions. More in particular this invention relates to compositions of semi-solid or paste-like consistency which are capable of quickly setting into a rubbery and non-tacky solid at ambient room temperature.

In the dental profession often it is necessary for the dentist to obtain a negative pattern, in solid form, of all or a portion of the patient's mouth. These negative patterns of the mouth are generally referred to as "dental impressions." The dental impression therefore represents a reproduction, in negative form, embodying the contour of the patient's mouth particularly in the area of the teeth and gums. The dental impression thus made is then employed as the first step in the making of a correctly fitting dental appliance for the patient by methods well known in the art.

One of the known methods of making dental impressions is employing a liquid polysulfide polymer mixed with an oxidizing compound such as lead dioxide as a curing agent. Also inorganic chromate salts or cumene hydroperoxide as well as other known agents have been used as curing agents for the polysulfide polymers in various applications.

Lead peroxide probably is the most widely used curing agent for polysulfide polymers but is disadvantageous for some dental work because it is toxic, stains strongly and from an aesthetic viewpoint its color is unpleasant for oral applications. Cumene hydroperoxide is equally objectionable as a curing agent because it possesses a penetrating odor and obnoxious taste which may induce nausea in dental patients.

From the foregoing it can be readily seen that it is exceeding desirable to obtain means for curing liquid polysulfide polymers into a dimensionally stable elastomeric material particularly adapted for making dental impressions without the heretofore mentioned objectionable characteristics. Thus the desired product should be non-toxic and non-irritating to the mouth, free from objectionable odor and taste, non-tacky, dimensionally stable and have the ability to set rapidly at temperatures of the human mouth.

It is therefore a principal object of this invention to provide a means for curing polysulfide polymers into a solid elastomeric material at body temperatures or below.

A further important object of this invention is to provide a means for curing liquid polysulfide polymers into a solid dimensionally stable, non-tacky elastomeric material according to the preceding object wherein the low temperature setting time is controllable selectively.

Another important object of this invention is to provide a means for curing liquid polysulfide polymers into a solid elastomeric material having any of various selected colors.

A still further object of this invention is to provide a means for curing liquid polysulfide polymers into a solid elastomeric material without objectionable taste or odor.

Yet another object of this invention is to provide a means for curing liquid polysulfide polymers into a non-toxic and non-irritating elastomeric material.

These and other desirable and important objects inherent in and encompassed by the invention will be understood more readily from the ensuing description and appended claims.

For purpose of this invention the terms "non-toxic" and "non-irritating" are intended to mean that the compositions are harmless on occasional contact in the human mouth and to those persons, such as dentists, having normal contact in handling and manipulating them.

The polysulfide polymers employed in this invention are well known per se and are fully described in U.S. Patent No. 2,466,963 issued to Joseph C. Patrick and Harry R. Ferguson. However the curing agents described in the present invention are applicable generally to any of the liquid polysulfide polymers therein described as well as other liquid polysulfide polymers of this general class.

According to the above mentioned patent to Patrick et al. these polysulfide polymers comprise molecular units of the class represented by the exemplary formula

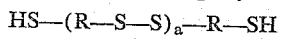

where R is an organic radical, S is sulfur and $a$ is a positive integer.

Considering the above formula it is recognized that in polymerizing reactions the resulting product is not a single compound having a definite molecular weight but is, to the contrary, a mixture of compounds of varying molecular weights which generally may not be isolated or separated from each other. Hence such product is said to have an "average molecular weight" as determined by well known methods. Thus the average molecular weight of such product is governed basically by the average number of the above indicated recurring units in each molecule (value of $a$) together with the number of mercaptan groups and the molecular weight of the organic radical R. Although in the above exemplary general formula is shown to be linear it should be understood that the recurring units (R—S—S) may also be of cross-linked structure. Furthermore the above exemplary formula illustrates two mercaptan (SH) groups but it should also be understood that each molecule may have possibly more than two mercaptan groups. However, for purposes of this invention each molecule of the polymer must contain at least two mercaptan groups as otherwise further polymerization may be limited to a low magnitude.

In the present invention, though not limited thereto, the liquid or semi-liquid polymerizable polyalkene polysulfide polymers known under the trade designation "Thiokol LP-2" were found to be particularly suitable for the preparation of elastomers for dental impressions. The precise chemical composition is not known with certainty to the undersigned but is believed to be a polyfunctional mercaptan polymer having an average structure corresponding to the formula

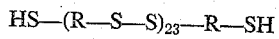

where R represents the organic group

The average molecular weight of Thiokol LP-2 is approximately 4000 but for the present invention the average molecular weight is limited only in that the polymer must be mobile at temperatures of 70 to 100° F., being the range between normal room temperature and temperatures of the human mouth. Thus the average molecular weight may range from 500 to 12,000 for the uncured polymer. In the case of polymers of the type of Thiokol LP-2 the average molecular weight preferably should be in the range of 3000 to 5000.

Heretofore, liquid or semi-liquid polymers of the type described such as Thiokol LP-2 were cured or further polymerized into solid, rubbery and non-tacky elastomeric products by the addition of oxidizing compounds, the curing or polymerization presumably taking place substantially in accordance with the following equation.

$$n(HS-(RSS)_{23}-R-SH) + nO_2 \rightarrow (RSS-)_y + nH_2O$$

where $n$ and $y$ are numerical values which may vary.

Thus the prior art suggests that in order to cure these liquid polysulfide polymers it is necessary to provide a curing agent having available oxygen therein to support a postulated oxidizing reaction.

It was found, apparently contrary to the prior art, that according to this invention inorganic metallic hydroxides were excellent curing agents for polymerizing liquid polysulfide polymers despite the fact that metallic hydroxides are not generally considered per se oxidizing agents particularly in the range of 70–100° F. Hydroxides of copper, lead and numerous complex basic salts or complex hydroxy salts containing the hydroxyl radical were found to be outstanding polymerizing or curing agents for polysulfide polymers such as Thiokol LP-2. More in particular it was discovered that the complex basic salts or complex hydroxy salts of copper and derivatives thereof wherein at least one hydroxyl radical is attached to the metal are particularly outstanding as curing agents for polysulfide polymers. Peculiarly it was found that stoichiometric quantities of metallic hydroxides were not necessary as in the case of heretofore known curing methods. Hydroxides of other metals such as lithium, antimony, strontium, cadmium, zinc, tin, chromium, manganese, nickel, iron, cobalt, barium and cerimum were employed successfully in this invention as curing agents. However for dental impression purposes some were found to unsatisfactory primarily because the curing rate was too slow at temperatures between 70–100° F.

In some instances it was found advantageous to incorporate a small amount of a reaction promoting agent to influence the rate of cure such as elemental sulfur or an organic amine to the uncured liquid polysulfide polymers. However, neither sulfur nor an organic amine will themselves cure the liquid polysulfide polymers. In the case of Thiokol LP-2 amounts ranging up to as high as 4% by weight based on the weight of the polymer were employed advantageously in some instances.

The chemical reactions involved in the curing of liquid and semi-liquid polysulfide polymers employing inorganic hydroxides are not understood. The fact that stoichiometric quantities of the polymer and hydroxides do not appear to be necessary in every case possibly suggests an auto-type reaction. If the metallic hydroxides of only polyvalent metals could be employed then it might be presumed that intermediate linkage was affected by the union of the metal with the mercaptan groups. However this is refuted by the fact that hydroxides of monovalent metals also have been successfully employed. Catalysis by the hydroxides to facilitate oxidation by atmospheric oxygen to cure the polysulfide polymers appears to be refuted by the fact that a large mass may be cured with metal hydroxides, the curing progresses internally about as fast as that exposed to the atmosphere. This observation was further confirmed by the fact that the curing proceeded equally as well under a vacuum as high as 28 inches of mercury. Furthermore, the presence of elemental sulfur or an amine promotor was not necessary in most instances. From these observations no attempt is made to explain the theoretical reactions involved in the curing of the liquid polymer into a solid elastomeric material with metallic hydroxides.

Particularly in dental impression application, the composition should be of a semi-solid paste-like consistency in the uncured state for insertion into the patient's mouth. Since the uncured polysulfide polymers are of a liquid consistency it is necessary to add inert fillers as thickening agents. Powdered titanium dioxide in proper proportions mixed with the uncured liquid polysulfide polymers results in a composition having the desired paste-like consistency. Obviously other inert fillers may be substituted for the titanium dioxide with satisfactory results. Of course for dental impression materials, the filler selected should not be toxic or have an objectionable taste or odor. Titanium dioxide was chosen because it is white in color thus tending to make the uncured composition and the cured product light in color.

In order to illustrate further the invention the following specific examples are shown. All were performed at room temperature (70–80° F.) and all portions being in parts by weight. The uncured liquid polysulfide polymer employed in each case was the above described Thiokol LP-2 having an average molecular weight of about 4000.

EXAMPLE I

A first mixture of paste-like consistency was prepared by mixing the following designated ingredients:

Mixture A

|  | Grams | Percent |
| --- | --- | --- |
| Cupric hydroxide | 80 | 41.6 |
| Titanium dioxide | 30 | 15.8 |
| Dibutylphthalate | 82 | 42.6 |

A second mixture of paste-like consistency was prepared having the following designated ingredients:

Mixture B

|  | Grams | Percent |
| --- | --- | --- |
| Liquid polysulfide polymers | 9.9 | 79.2 |
| Sulfur | 0.1 | 0.8 |
| Titanium dioxide | 2.5 | 20.0 |

Two grams of Mixture A were added to four grams of Mixture B and blended together in 30 to 45 seconds. The resulting composition set into a non-tacky, rubbery elastomeric product, blue in color, in a period of 8 minutes.

EXAMPLE II

The following ingredients were blended together in 30–45 seconds:

|  | Grams | Percent |
| --- | --- | --- |
| Cupric hydroxide | 0.1 | 4.8 |
| Liquid polysulfide polymers | 1.94 | 92.4 |
| Sulfur | 0.06 | 2.8 |

The resulting composition set into a solid, non-tacky elastomeric product, blue in color, in a period of 2 hours.

EXAMPLE III

The following ingredients were blended together in 30–45 seconds:

|  | Grams | Percent |
| --- | --- | --- |
| Cupric hydroxide | 0.1 | 2.4 |
| Liquid polysulfide polymers | 3.88 | 94.7 |
| Sulfur | 0.12 | 2.9 |

The resulting composition set into a solid, non-tacky elastomeric product, blue in color, in a period of 2.5 hours. It will be noted that this example is similar to Example II except that the percent of cupric hydroxide curing agent was reduced by one-half.

Repeating Examples II and III but omitting the elemental sulfur the setting time was found to exceed 70 hours. However setting did occur in about one week.

EXAMPLE IV

The following ingredients were blended together in 30–45 seconds:

|  | Grams | Percent |
|---|---|---|
| Cupric oxychloride | 0.1 | 4.8 |
| Liquid polysulfide polymers | 2.0 | 95.2 |

The resulting composition set into a good elastomeric product, blue in color, in a period of 2 hours.

EXAMPLE V

The following ingredients were blended together in 30–45 seconds:

|  | Grams | Percent |
|---|---|---|
| Cupric oxychloride | 0.1 | 2.4 |
| Liquid polysulfide polymers | 4.0 | 97.6 |

The resulting composition set into an excellent elastomeric product, blue in color, in a period of 2.5 hours. It will be noted that this example is similar to Example IV except that the percent of the curing agent was reduced by one-half.

EXAMPLE VI

The following ingredients were blended together in 30–45 seconds:

|  | Grams | Percent |
|---|---|---|
| Cupric oxychloride | 0.1 | 4.8 |
| Liquid polysulfide polymers | 1.94 | 92.4 |
| Sulfur | 0.06 | 2.8 |

The resulting composition set into a superior elastomeric product, blue in color, in a period of 2 hours.

EXAMPLE VII

The following ingredients were blended together in 30–45 seconds:

|  | Grams | Percent |
|---|---|---|
| Cupric oxychloride | 0.1 | 2.4 |
| Liquid polysulfide polymers | 3.88 | 94.7 |
| Sulfur | 0.12 | 2.9 |

The resulting composition set into a superior elastomeric product, blue in color, in a period of 2.5 hours. It will be noted that this example is similar to Example VI except that the percent of curing agent was reduced by one-half.

EXAMPLE VIII

The following ingredients were blended together in 30–45 seconds:

|  | Grams | Percent |
|---|---|---|
| Tribasic copper sulfate | 0.1 | 4.8 |
| Liquid polysulfide polymers | 2.0 | 95.2 |

The resulting composition set into an excellent elastomeric product, blue in color, in a period of 2 hours.

EXAMPLE IX

The following ingredients were blended together in 30–45 seconds:

|  | Grams | Percent |
|---|---|---|
| Copper hydroxide | 12.0 | 54.9 |
| Liquid polysulfide polymers | 9.7 | 44.1 |
| Sulfur | 0.3 | 1.4 |

The resulting product set into an excellent elastomeric product, blue in color, in a period of 10 minutes.

EXAMPLE X

The following ingredients were blended together in 30–45 seconds:

|  | Grams | Percent |
|---|---|---|
| Cerium hydroxide (ic) | 6.5 | 39.4 |
| Liquid polysulfide polymers | 9.7 | 58.8 |
| Sulfur | 0.3 | 1.8 |

The resulting composition set into a good elastomeric product in a period of 6 hours.

NOTE.—When 0.12 centigram of nonylamine was blended with the same ingredients as above, the resulting composition set into a good elastomeric product in a period of 25 minutes.

EXAMPLE XI

The following ingredients were blended together in 30–45 seconds:

|  | Grams | Percent |
|---|---|---|
| Nickel hydroxide (ous) | 6.5 | 39.4 |
| Liquid polysulfide polymers | 9.7 | 58.8 |
| Sulfur | 0.3 | 1.8 |

The resulting composition set into a good elastomeric product in a period of 13 hours.

NOTE.—When 0.1 centigram of diethylene triamine was blended with the same ingredients, the resulting composition set into a good elastomeric product in a period of 6 minutes.

EXAMPLE XII

The following ingredients were blended together in 30–45 seconds:

|  | Grams | Percent |
|---|---|---|
| Manganese hydroxide (manganic hydroxide) MnO(OH) | 4.8 | 32.4 |
| Liquid polysulfide polymers | 9.7 | 65.6 |
| Sulfur | 0.3 | 2.0 |

The resulting composition set into a good elastomeric product in a period of 70 minutes.

EXAMPLE XIII

The following ingredients were blended together in 30–45 seconds:

|  | Grams | Percent |
|---|---|---|
| Cadmium hydroxide Cd(OH)$_2$ | 2.0 | 17.1 |
| Liquid polysulfide polymers | 9.7 | 82.9 |

The resulting composition set into a good elastomeric product in a period of 6 hours.

NOTE.—When 0.05 centigram of monoethanolamine was blended with the same ingredients, the resulting composition set into a good elastomeric product in a period of 5 minutes.

From the above it appears that an effective amount of an hydroxide curing agent of this invention is not greater than 60 percent by weight based on the blended composition with the uncured polysulfide polymers.

For comparison purpose to illustrate further the invention, the well known lead peroxide curing agent was employed in the following four examples.

EXAMPLE XIV

The following ingredients were blended together in 30-45 seconds:

|  | Grams | Percent |
|---|---|---|
| Lead dioxide | 0.1 | 2.4 |
| Liquid polysulfide polymers | 4.0 | 97.6 |

The resulting composition did not set in a period of 70 hours.

EXAMPLE XV

The following ingredients were blended together in 30-45 seconds:

|  | Grams | Percent |
|---|---|---|
| Lead dioxide | 0.1 | 4.8 |
| Liquid polysulfide polymers | 2.0 | 95.2 |

The resulting composition set into a good elastomeric product but black in color in a period of 4 hours.

EXAMPLE XVI

The following ingredients were blended together in 30-45 seconds:

|  | Grams | Percent |
|---|---|---|
| Lead dioxide | 0.1 | 2.4 |
| Liquid polysulfide polymers | 3.88 | 94.7 |
| Sulfur | 0.12 | 2.9 |

The resulting composition set into a fair elastomeric product but black in color in a period of 70 hours. It will be observed that this example is similar to Example XIV except that elemental sulfur was added.

EXAMPLE XVII

The following ingredients were blended together in 30-45 seconds:

|  | Grams | Percent |
|---|---|---|
| Lead dioxide | 0.1 | 2.4 |
| Liquid polysulfide polymers | 2.84 | 93.7 |
| Sulfur | 0.16 | 3.9 |

The resulting composition did not set in a period of 70 hours. It will be observed that this example is similar to Example XIV except that elemental sulfur was added.

In all examples where elemental sulfur was added, a composite of the liquid polysulfide polymers and the sulfur was first made and the composite thus made was employed in blending with the balance of the formula.

It will be understood that in the preceding examples the filler material, such as titanium dioxide, may be added as shown in Example I to make the uncured composition of suitable consistency for dental impression applications. Therefore it is obvious that anyone skilled in the art may compound the uncured composition employing any of the basic reactions shown in Examples II to XIII.

For clarification formulas for the various curing agents of this invention employed in the above examples are believed to be as shown below.

Cerium hydroxide, $Ce(OH)_4$
Cupric hydroxide, $Cu(OH)_2$
Cupric oxychloride, $Cu_2(OH)_3Cl$
Cadmium hydroxide, $Cd(OH)_2$
Nickel hydroxide, $Ni(OH)_2$
Tribasic copper sulfate, $CuSO_4 \cdot 3Cu(OH)_2 H_2O$
Manganese hydroxide (manganic hydroxide), $MnO(OH)$ Other basic salts such as basic cupric carbonate, $CuCO_3 \cdot Cu(OH)_2$, copper nitrite (basic)

$$Cu(NO_2)_2 \cdot 3Cu(OH)_2$$

copper nitrate (basic) $Cu(NO_3)_2 \cdot 3Cu(OH)_2$ and copper acetate (basic) $(CH_3COO)_2 Cu \cdot Cu(OH)_2$ were employed successfully in this invention.

It was observed also that the particle size of the solid curing agents of this invention influenced the rate of cure markedly. This phenomenon results apparently from the variation in area of exposed surface of the curing agent to the polymers due to variation in particle size. It is therefore suggested that in order to maintain consistent curing rates, the selected particle size of the curing agent should be constant from one batch to another. The particle size of the curing agents of this invention should be 325 mesh or finer to obtain most satisfactory results although 100 mesh particle size was found to be operative. Particle sizes of 2 to 6 microns and even as low as one micron were found to give excellent results.

It will be noted that in each of the foregoing examples except where lead peroxide was used the curing agents employed contained the characteristic hydroxy radical attached to the metal. In order to determine further the functional activity of the hydroxide radical several compounds without the hydroxy radical were tried in the same manner as the above examples without success. Thus for example cupric chloride, cuprous chloride, cupric oxide, cuprous oxide and litharge were observed not to exhibit any tendency in curing liquid polysulfide polymers. From this it is concluded that the labile hydroxy radical attached to the metal of inorganic hydroxides is the functional portion of the curing agents of this invention and that the balance of the curing agents' molecular structure influences the curing rate.

In some applications it is quite desirable to provide means for extending the period of time required for setting polysulfide polymers into elastomeric products without resorting to a different curing agent. This permits more time in which the composition may be worked prior to setting. In the case of the known curing agent lead dioxide, this was accomplished by the addition of organic fatty acids such as stearic acid and the like as cure retarding agents. However when inorganic hydroxide compounds are used as curing agents according to this invention it was found that in many instances acidic type retarding agents, such as the organic fatty acids, were ineffective. In order to provide means for improved control of curing rates for use in connection with curing the uncured polysulfide polymers of the kind described with metallic hydroxides as curing agents it was found as part of this invention that polyols such as glycerine, boranes and organic derivatives of boric acid were very effective cure retarding agents.

In order to illustrate the effectiveness of these retarding agents a series of experiments were made on compositions of the type suitable for making dental impressions wherein the variable is confined only to the cure retarder.

The specific formulas of various cure-retarding agents are believed to be as shown below.

Boroglycerine, $C_3H_5BO_3$
Pyridine borane, $C_5H_5N:BH_3$
Ethyl borate, $(C_2H_5)_3BO_3$
Diglycerol, $C_6H_{14}O_5$
Tri-o-cresyl borate, $(CH_3C_6H_4)_3BO_3$
Dimethylamine borane, $(CH_3)_2HNBH_3$ From the above it can be seen readily that polyols, boranes and organic derivatives of boric acid employed separately or in combination are very effective in retarding the curing rate of polysulfide polymers from a period of 45 seconds to 2 hours when a given inorganic metallic hydroxide curing agent is employed. Similar observations were noted when these cure-retarding agents were employed with other metallic hydroxides.

In many of the foregoing examples the elastomeric products obtained were essentially light in color. Thus it is obvious that the product may be colored by the addition of a small amount of an inert and non-toxic coloring agent to obtain any desired color. Such coloring agents are well known and commercially available. Likewise for dental impression application an inert and non-toxic flavoring agent may be added to impart a pleasing taste or odor to the product. Such flavoring agents are also well known and available commercially.

It is also recognized that the elastomeric products obtained in accordance with this invention may be employed in other than dental impression applications. For example cured polysulfide polymers of the kind described may be employed as sealing agents such as in gasoline containing conduits and tanks for aircraft and the like because these elastomers are quite resistant to attack by many organic solvents, e.g. hydrocarbons. Also these elastomers may be used as sealers for metal windows, electrical appliances and dental uses other than impression materials. In addition such elastomers may be used in treatment of animal hides and in making topographical or relief maps.

Having now described numerous embodiments of the invention it can now be seen that the objects of the invention have been fully achieved and it must be understood that changes and modifications may be made which do not depart from the spirit of the invention nor from the scope thereof as defined in the appended claims.

What is claimed is:

1. The method of producing a solid elastomeric cured product comprising the step of preparing a blended composition, said composition consisting essentially of an effective amount up to about 60 percent by weight of a metal bearing compound having at least one hydroxy radical attached to said metal in each molecule thereof as a curing agent, said metal of said metal bearing compound being selected from the group consisting of copper, lithium, antimony, strontium, cadmium, zinc, tin, chromium, manganese, nickel, iron, cobalt, barium, lead, and cerium; and the balance being a mixture of uncured liquid organic polythiopolymercaptan polymers having an average molecular weight of betwen about 500 and about 12,000, by mixing said compound with said polymers to form said blended composition, said blended composition thereafter curing to form said solid elastomeric cured product at not less than ambient temperature.

2. The method of producing a solid elastomeric cured product comprising the step of preparing a blended composition, said composition consisting essentially of an effective amount up to about 60 percent by weight of a metal bearing compound having at least one hydroxy radical attached to said metal in each molecule thereof as a curing agent, said metal of said metal bearing compound being selected from the group consisting of copper, lithium, antimony, strontium, cadmium, zinc, tin, chromium, manganese, nickel, iron, cobalt, barium, lead, and cerium; and the balance being a mixture of uncured liquid organic polythiopolymercaptan polymers having an average molecular weight of between about 3000 and about 5000, by mixing said compound with said polymers to form said blended composition, said blended composition thereafter curing to form said solid elastomeric cured product at not less than ambient temperature.

3. The method of producing a solid elastomeric product comprising the step of preparing a blended composition, said composition consisting essentially of from about 2.4 to about 4.8 percent by weight of cupric hydroxide, from about 2.8 to about 2.9 percent by weight of elemental sulfur, and from about 92.4 to 94.7 percent by weight of liquid uncured organic polythiopolymercaptan polymers, by mixing said cupric hydroxide with said polymers and said sulfur to form said blended composition, said blended composition thereafter curing to form said solid elastomeric cured product at not less than ambient temperature.

4. The method of producing a solid elastomeric cured product comprising the step of preparing a blended composition, said composition consisting essentially of from about 2.4 to about 4.8 percent by weight of cupric oxychloride and from about 95.2 to 97.6 percent by weight of uncured liquid organic polythiopolymercaptan polymers, by mixing said cupric oxychloride with said polymers to form said blended compositon, said blended composition thereafter curing to form said solid elastomeric cured product at not less than ambient temperature.

5. The method of producing a solid elastomeric cured product comprising the step of preparing a blended composition, said composition consisting essentially of from about 2.4 to about 4.8 percent by weight of cupric oxychloride, from about 2.8 to 2.9 percent by weight of elemental sulfur, and from about 92.4 to about 94.7 percent by weight of uncured liquid organic polythiopolymercaptan polymers, by mixing said cupric oxychloride with said polymers and said sulfur to form said blended composition, said blended composition thereafter curing to form said solid elastomeric cured product at not less than ambient temperature.

6. The method of producing a solid elastomeric cured product comprising the step of preparing a blended composition, said composition consisting essentially of about 4.8 percent by weight of tribasic copper sulfate and about 95.2 percent by weight of uncured liquid organic polythiopolymercaptan polymers, by mixing said tribasic copper sulfate with said polymers to form said blended composition, said blended composition thereafter curing to form said solid elastomeric cured product at not less than ambient temperature.

7. The method of producing a solid elastomeric cured product comprising the step of preparing a blended composition, said composition consisting essentially of about 32.4 percent by weight of manganese hydroxide, about 2.0 percent by weight of elemental sulfur, and about 65.6 percent by weight of uncured liquid organic polythiopolymercaptan polyers, by mixing said hydroxide with said polymers and said sulfur to form said blended composition, said blended composition thereafter curing to form said solid elastomeric cured product at not less than ambient temperature.

8. The method of producing a solid elastomeric cured product comprising the step of preparing a first mixture consisting essentially of an effective amount up to 60 percent by weight of a metal bearing compound having at least one hydroxy radical attached to said metal in each molecule thereof as a curing agent, said metal of said metal bearing compound being selected from the group consisting of copper, lithium, antimony, strontium, cadmium, zinc, tin, chromium, manganese, nickel, iron, cobalt, barium, lead, and cerium; a powdered inert filler and a liquid inert plasticizer in proportions sufficient to provide said first mixture with a semi-solid consistency, a second mixture consisting of uncured liquid organic polythiopolymercaptan polymers, said organic polythiopolymercaptan polymers having an average molecular weight of between about 3000 to about 5000, and a powdered inert filler in an amount sufficient to provide said second mixture with a semi-solid consistency of similar magnitude as that of said first mixture, blending a composition consisting of about one part by weight of said first mixture with about two parts by weight of said second mixture, by intermixing said mixtures to form said blended composition, said blended composition thereafter curing to form said solid elastomeric cured product at not less than ambient temperature.

9. The method of producing a solid elastomeric cured product comprising the step of preparing a first mixture consisting essentially of about 80 parts by weight of cupric hydroxide as a curing agent, about 30 parts by weight of powdered titanium dioxide as a filler and about 82 parts by weight of dibutylphthalate as a plasticizer, a second mixture consisting of about 99 parts by weight of uncured liquid organic polythiopolymercaptan polymers having an average molecular weight of between about 3000 to about 5000, one part by weight of elemental sulfur as a reaction promoting agent, and 25 parts by weight of powdered titanium dioxide as a filler, blending a composition consisting of about one part by weight of said first mixture with about two parts by weight of said second mixture, by intermixing said mixtures to form said blended composition, said blended composition thereafter curing to form said solid elastomeric cured product at not less than ambient temperature.

10. The method of producing a solid elastomeric cured product comprising the step of preparing a first mixture consisting of about 16 parts by weight of copper oxychloride sulfate as a curing agent and about 20 parts by weight of dibutylphthalate as a plasticizer, a second mixture consisting of about 99 parts by weight of uncured liquid organic polythiopolymercaptan polymers, said organic polythiopolymercaptan polymers having an average molecular weight of between about 3000 and about 5000, one part by weight of elemental sulfur as a reaction promoting agent, and 25 parts by weight of powdered titanium dioxide as a filler, blending a composition consisting of about one part by weight of said first mixture with about two parts by weight of said second mixture, by intermixing said two mixtures to form said blended composition, said blended composition thereafter curing to form said solid elastomeric cured product at not less than ambient temperature.

11. The method of claim 1 further characterized by and including the step of retarding controllably the rate of cure of said polymers by adding boroglycerine to the blended composition up to about 10 percent by weight based on the weight of the cured product.

12. The method of claim 1 further characterized by and including the step of retarding controllably the rate of cure of said polymers by adding pyridine borane to the blended composition up to about 10 percent by weight based on the weight of the cured product.

13. The method of claim 1 further characterized by and including the step of retarding controllably the rate of cure of said polymers by adding ethyl borate to the blended composition up to about 10 percent by weight based on the weight of the cured product.

14. The method of claim 1 further characterized by and including the step of retarding controllably the rate of cure of said polymers by adding dimethylamine borane to the blended composition up to about 10 percent by weight based on the weight of the cured product.

15. The method of claim 1 further characterized by and including the step of retarding controllably the rate of cure of said polymers by adding tri-o-cresyl borate to the blended composition up to about 10 percent by weight based on the weight of the cured product.

16. The method of claim 1 further characterized by and including the step of retarding controllably the rate of cure of said polymers by adding diglycerol to the blended composition up to about 10 percent by weight based on the weight of the cured product.

References Cited in the file of this patent

UNITED STATES PATENTS

| 2,466,963 | Patrick et al. | Apr. 12, 1949 |
| 2,600,354 | Wiss | June 10, 1952 |
| 2,849,416 | Bender et al. | Aug. 26, 1958 |

FOREIGN PATENTS

| 780,545 | Great Britain | Aug. 7, 1957 |

OTHER REFERENCES

Hackh's "Chemical Dictionary," 3rd Edition (1944), page 242.